(12) United States Patent
Balestrino et al.

(10) Patent No.: US 9,109,518 B2
(45) Date of Patent: Aug. 18, 2015

(54) METHOD AND APPARATUS FOR MONITORING PERFORMANCE OF EGR HEAT EXCHANGER

(75) Inventors: Sandro R. Balestrino, Plymouth, MI (US); Alok Warey, Troy, MI (US); Patrick G. Szymkowicz, Shelby Township, MI (US); Xiaobin Li, Bloomfield Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 618 days.

(21) Appl. No.: 13/478,219

(22) Filed: May 23, 2012

(65) Prior Publication Data

US 2013/0312716 A1    Nov. 28, 2013

(51) Int. Cl.
*F02B 47/08* (2006.01)
*F02D 21/08* (2006.01)
*F02M 25/07* (2006.01)

(52) U.S. Cl.
CPC .............. *F02D 21/08* (2013.01); *Y02T 10/121* (2013.01)

(58) Field of Classification Search
CPC .............................. Y02T 10/121; F02D 21/08
USPC ...................... 123/568.12, 568.16; 73/117.14
See application file for complete search history.

(56) References Cited

U.S. PATENT DOCUMENTS

| | | | | |
|---|---|---|---|---|
| 4,967,717 A | * | 11/1990 | Miyazaki et al. | 73/114.74 |
| 4,974,572 A | * | 12/1990 | Aramaki | 73/114.74 |
| 5,014,203 A | * | 5/1991 | Miyazaki et al. | 701/108 |
| 5,209,212 A | * | 5/1993 | Viess et al. | 123/568.16 |
| 5,243,949 A | * | 9/1993 | Osawa | 123/676 |
| 5,732,688 A | * | 3/1998 | Charlton et al. | 123/568.12 |
| 6,085,732 A | * | 7/2000 | Wang et al. | 123/568.12 |
| 6,161,528 A | | 12/2000 | Akao et al. | |
| 6,257,214 B1 | * | 7/2001 | Bidner et al. | 123/568.16 |
| 6,347,519 B1 | * | 2/2002 | Kreso | 60/602 |
| 6,401,457 B1 | * | 6/2002 | Wang et al. | 60/599 |
| 6,601,387 B2 | | 8/2003 | Zurawski et al. | |
| 6,622,548 B1 | * | 9/2003 | Hernandez | 73/114.74 |
| 6,848,434 B2 | * | 2/2005 | Li et al. | 123/568.12 |
| 6,993,909 B2 | * | 2/2006 | Matsunaga et al. | 60/605.2 |
| 7,881,858 B2 | * | 2/2011 | Kress et al. | 701/107 |
| 8,037,737 B2 | | 10/2011 | Recouvreur et al. | |
| 8,725,386 B2 | * | 5/2014 | Khair et al. | 701/102 |
| 2002/0144674 A1 | * | 10/2002 | Wang et al. | 123/568.21 |
| 2010/0043525 A1 | * | 2/2010 | Recouvreur et al. | 73/23.31 |
| 2014/0014076 A1 | * | 1/2014 | Jayakar | 123/568.12 |
| 2014/0060503 A1 | * | 3/2014 | Zhu et al. | 123/568.12 |

* cited by examiner

*Primary Examiner* — Thomas Moulis
*Assistant Examiner* — Arnold Castro

(57) ABSTRACT

An internal combustion engine is equipped with an EGR system that includes an EGR heat exchanger. A method for monitoring the EGR heat exchanger includes monitoring an EGR gas inlet temperature to the EGR heat exchanger, an EGR gas outlet temperature from the EGR heat exchanger, a coolant temperature and a mass EGR flowrate through the EGR heat exchanger for a present engine operating point. An actual thermal effectiveness of the EGR heat exchanger for the present engine operating point is determined. A maximum heat transfer coefficient for the EGR side of the EGR heat exchanger is determined for the present engine operating point. The EGR heat exchanger is regenerated when the actual heat transfer coefficient differs from the maximum heat transfer coefficient for the present engine operating point.

3 Claims, 3 Drawing Sheets

_US 9,109,518 B2_

METHOD AND APPARATUS FOR MONITORING PERFORMANCE OF EGR HEAT EXCHANGER

TECHNICAL FIELD

This disclosure is related to internal combustion engines employing EGR systems with heat exchangers.

BACKGROUND

The statements in this section merely provide background information related to the present disclosure. Accordingly, such statements are not intended to constitute an admission of prior art.

Known internal combustion engines may be configured with exhaust gas recirculation (EGR) systems to reduce emissions of nitrogen oxides (NOx) by reducing peak combustion temperatures within the engine cylinders during transient and steady-state operating conditions. Known EGR systems divert flow of a portion of exhaust gas into an intake system of the engine, and include a controllable EGR valve, an EGR cooling system including a heat exchanger, and suitable piping elements. Flow of the EGR gas in the direction of the intake system may be induced by a pressure differential between the intake and exhaust systems.

EGR cooling systems are susceptible to fouling, which can reduce thermal effectiveness of the EGR cooling system and controllability of the EGR valve. Fouling may be caused by precipitation of hydrocarbons and particulate matter onto a surface of the heat exchanger. Fouling of the EGR cooling system may result in reduced heat transfer from EGR gas and reduced EGR flow, thus affecting peak combustion temperatures and increasing NOx emissions. Precipitated hydrocarbons, particulate matter, and other exhaust elements may harden through aging and repetitive temperature cycles associated with engine shutdown and startup. Fouling of an EGR cooling system also affects mass flowrate of EGR gas and thermal performance of the EGR cooling system.

SUMMARY

An internal combustion engine is equipped with an EGR system that includes an EGR heat exchanger. A method for monitoring the EGR heat exchanger includes monitoring an EGR gas inlet temperature to the EGR heat exchanger, an EGR gas outlet temperature from the EGR heat exchanger, a coolant temperature and a mass EGR flowrate through the EGR heat exchanger for a present engine operating point. An actual thermal effectiveness of the EGR heat exchanger for the present engine operating point is determined A maximum heat transfer coefficient for the EGR side of the EGR heat exchanger is determined for the present engine operating point. The EGR heat exchanger is regenerated when the actual heat transfer coefficient differs from the maximum heat transfer coefficient for the present engine operating point.

BRIEF DESCRIPTION OF THE DRAWINGS

One or more embodiments will now be described, by way of example, with reference to the accompanying drawings, in which.

DETAILED DESCRIPTION

Figure 1:
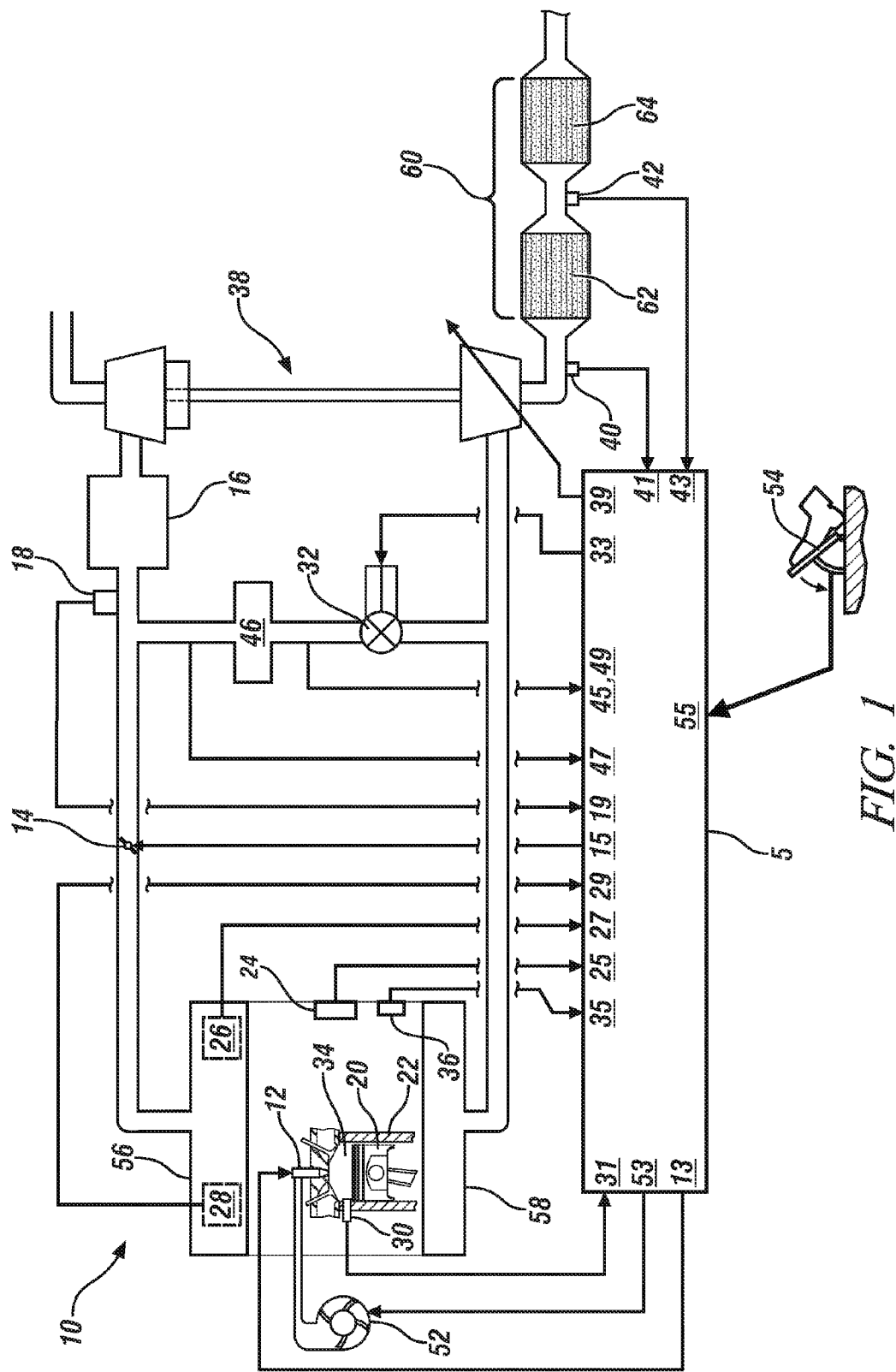
FIG. 1 illustrates an exemplary internal combustion engine, control module, and exhaust aftertreatment system, in accordance with the present disclosure.

Referring now to the drawings, wherein the showings are for the purpose of illustrating certain exemplary embodiments only and not for the purpose of limiting the same, FIG. 1 illustrates an exemplary internal combustion engine 10, control module 5, and exhaust aftertreatment system 60. The exemplary engine 10 includes a multi-cylinder, direct-injection, compression-ignition internal combustion engine including an intake manifold 56 and an exhaust manifold 58, and having reciprocating pistons 20 attached to a crankshaft and movable in cylinders 20 which define variable volume combustion chambers 34. The crankshaft may be attached to a vehicle transmission and driveline to deliver tractive torque thereto in response to an output torque request. The engine preferably employs a four-stroke operation wherein each engine combustion cycle includes 720° of angular rotation of crankshaft divided into four 180° stages of reciprocating movement of the piston 20 in the engine cylinder 22. Each variable volume combustion chamber 34 is defined between the piston 20 the cylinder 22, and a cylinder head as the piston 20 translates in the cylinder 22 between top-dead-center and bottom-dead-center points. The cylinder head includes intake valves and exhaust valves. The engine preferably operates in a four-stroke combustion cycle that includes intake, compression, expansion, and exhaust strokes. It is appreciated that the concepts described herein apply to other combustion cycles. The engine 10 preferably operates at a lean air/fuel ratio. The exhaust aftertreatment system 60 fluidly couples to an engine exhaust outlet, e.g., an exhaust manifold that entrains exhaust gas. The exhaust aftertreatment system 60 preferably includes an oxidation catalyst 62 fluidly upstream of a particulate filter 64. The disclosure is applicable to other engine configurations that employ diesel fuel. The disclosure is applicable to powertrain systems that employ internal combustion engines in combination with transmission devices to generate tractive torque, including by way of example engine-transmission systems and hybrid powertrain systems employing non-combustion torque generative motors.

The engine 10 includes sensors to monitor engine operation, and actuators that control engine operation. The sensors and actuators are signally and operatively connected to control module 5. The actuators are installed on the engine and controlled by the control module 5 in response to operator inputs to achieve various performance goals. A fuel injection system including a plurality of direct-injection fuel injectors 12 is fluidly coupled either directly or via a common-rail fuel distribution system to a pressurized fuel distribution system including a high-pressure fuel pump 52. The fuel pump 52 may be controlled to control fuel pressure 53. The fuel injectors 12 directly inject fuel into each of the combustion chambers 34 to form a cylinder charge in response to an injector control signal 13 from the control module 5. The fuel injectors 12 are individually supplied with pressurized fuel, and have operating parameters including a minimum pulsewidth and an associated minimum controllable fuel flow rate, and a maximum fuel flow rate. An exhaust gas recirculation (EGR) system includes a flow channel for directing flow of externally recirculated exhaust gas (EGR gas) between the exhaust manifold 58 and the intake manifold 56, an EGR valve 32 that is controlled via control signal 33 from the control module 5, and an EGR heat exchanger 46. The EGR heat exchanger 46 preferably includes a liquid/air heat exchanger that employs engine coolant to remove thermal energy from the EGR gas in one of a parallel or a cross-flow configuration. Monitored parameters of the EGR heat exchanger 46 include EGR gas inlet temperature 45, EGR gas outlet temperature 47, and EGR mass flowrate 49. The EGR gas inlet temperature 45, EGR gas outlet temperature 47, and EGR mass flowrate 49 are monitored using suitable devices and/or monitoring schemes. A coolant sensor 36 monitors the engine coolant temperature 35, and is employed to determine the inlet coolant temperature to the EGR heat exchanger 46. The EGR heat exchanger 46 may be arranged in either a counter-flow configuration or a parallel flow configuration with engine coolant on a cold side and EGR gas on a hot side. The EGR heat exchanger 46 is configured to thermally exchange heat between the EGR gas and the engine coolant.

An intake air compressor system 38 is configured to control flow of intake air to the engine 10 in response to a compressor boost command 39. The intake air compressor system 38 boosts a supply of intake air into the engine to increase engine mass airflow and thus increase engine power, including increasing intake air pressure to greater than ambient pressure. In one embodiment the intake air compressor system 38 is a variable-geometry turbocharger (VGT) system that includes a turbine device located in the exhaust gas stream rotatably coupled to a compressor device that is configured to increase flow of engine intake air. Alternatively, the intake air compressor system 38 may include other air compressor devices, e.g., a supercharger device. An air intercooler device 16 may be fluidly located between the intake air compressor 38 and the engine intake manifold 56. An electronically-controlled throttle valve 14 controls throttle opening and thus flow of intake air into the intake system of the engine in response to a throttle control signal (ETC) 15. A glow-plug may be installed in each of the combustion chambers 34 for increasing in-cylinder temperature during engine starting events at cold ambient temperatures. The engine 10 may be equipped with a controllable valve train configured to adjust openings and closings of intake and exhaust valves of each of the cylinders, including any one or more of valve timing, phasing (i.e., timing relative to crank angle and piston position), and magnitude of lift of valve openings.

The sensors described herein are configured to monitor physical characteristics and generate signals that correlate to engine, exhaust gas, and ambient parameters. A crank sensor 24 interacts with a multi-tooth target wheel attached to the crankshaft to monitor engine crank position and engine speed (RPM) 25. A combustion pressure sensor 30 is configured to monitor cylinder pressure 31, from which a mean-effective pressure or another suitable combustion parameter may be determined. The combustion pressure sensor 30 may be non-intrusive, including a force transducer having an annular cross-section that is installed into the cylinder head at an opening for a glow-plug and having an output signal that is proportional to cylinder pressure. The pressure sensor 30 includes a piezo-ceramic or other suitable monitoring device.

A mass air flow (MAF) sensor 18 monitors mass air flow 19 of fresh intake air. A manifold absolute pressure (MAP) sensor 26 monitors intake manifold absolute pressure 27 and ambient barometric pressure. A manifold air temperature (MAT) sensor 28 monitors intake manifold air temperature 29. Exhaust gas sensors 40 and 42 monitor states 41 and 43 respectively, of one or more exhaust gas parameters, e.g., air/fuel ratio, and exhaust gas constituents, and may be used as feedback for control and diagnostics. Other sensors and monitoring schemes may be employed for purposes of control and diagnostics. Operator input in the form of an output torque request 55 may be obtained through an operator interface system 54 that preferably includes an accelerator pedal and a brake pedal, among other devices. Each of the aforementioned sensors is signally connected to the control module 5 to provide signal information which is transformed to information representative of the respective monitored parameter. It is understood that this configuration is illustrative, not restrictive, including the various sensors being replaceable with functionally equivalent devices and algorithms.

The control module 5 executes routines stored therein to control the aforementioned actuators to control engine operation, including throttle position, fuel injection mass and timing, EGR valve position to control flow of recirculated exhaust gases, compressor boost, glow-plug operation, and control of intake and/or exhaust valve timing, phasing, and lift on systems so equipped. The control module 5 is configured to receive the operator inputs (e.g., a throttle pedal position and a brake pedal position) to determine the output torque request 55 and receive signal inputs from the sensors indicating engine operation and ambient conditions. The engine 10 is configured to generate output torque in response to the output torque request 55, including operating over a broad range of temperatures, cylinder charge (air, fuel, and EGR) and injection events. The methods described herein are particularly suited to application on direct-injection compression-ignition engines operating lean of stoichiometry.

Control module, module, control, controller, control unit, processor and similar terms mean any suitable one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other suitable components to provide the described functionality. Software, firmware, programs, instructions, routines, code, algorithms and similar terms mean any controller executable instruction sets including calibrations and look-up tables. The control module 5 has a set of control routines executed to provide the desired functions. The routines are preferably executed during preset loop cycles. Routines are executed, such as by a central processing unit, and are operable to monitor inputs from sensing devices and other networked control modules, and execute control and diagnostic routines to control operation of actuators. Loop cycles may be executed at regular intervals, for example each 3.125, 6.25, 12.5, 25 and 100 milliseconds during ongoing engine and vehicle operation. Alternatively, routines may be executed in response to occurrence of an event.

Figure 2:
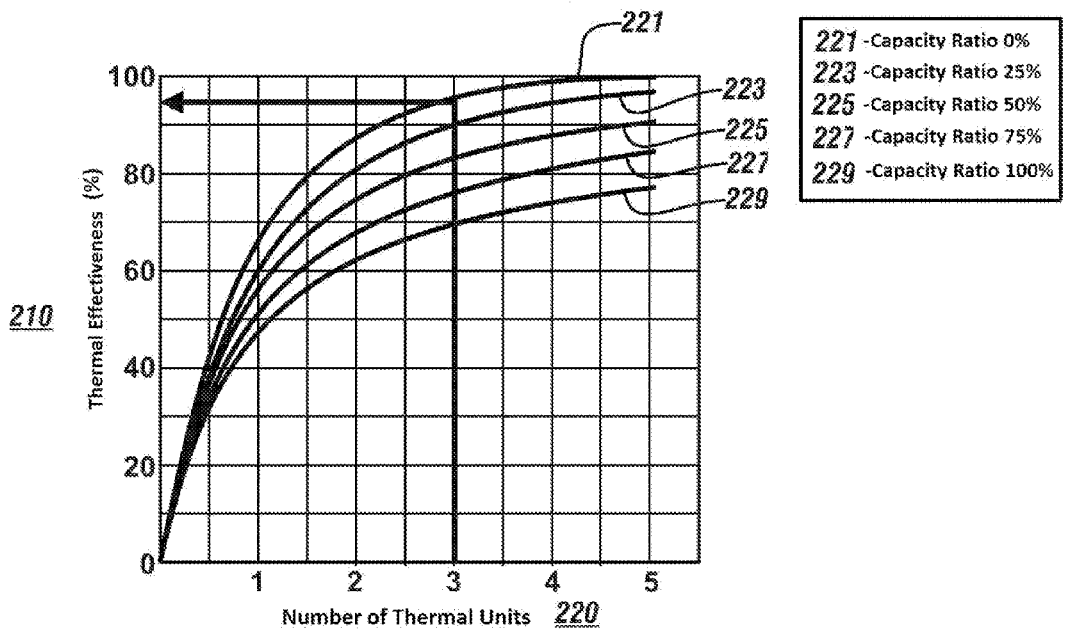
FIG. 2 illustrates data for an exemplary heat exchanger device including thermal effectiveness e (%) correlated to NTU for capacity ratios from 0% to 100%, in accordance with the disclosure.

FIG. 2 graphically shows a relationship for an exemplary heat exchanger device including thermal effectiveness $\epsilon$ (%) on the vertical-axis 210 correlated to Number of Transfer Units (NTU) on the horizontal-axis 220, wherein the hot fluid and cold fluid flow in a counter-flow arrangement. The relationship between thermal effectiveness ε (%) and Number of Transfer Units (NTU) is known to those having ordinary skill in the art. The depicted data includes results for capacity ratios of 0% 221, 25% 223, 50% 225, 75% 227, and 100% 229. The capacity ratio is calculated as follows:

$$\text{Capacity Ratio}(Cr) = \frac{\dot{m}_{gas} * cp_{gas}}{\dot{m}_{coolant} * cp_{coolant}} \quad [1]$$

wherein $\dot{m}_{gas}$ is the mass flowrate of the fluid being cooled, e.g., EGR gas;

$cp_{gas}$ is the specific heat of the fluid being cooled;

$\dot{m}_{coolant}$ is the mass flowrate of the coolant fluid, e.g., engine coolant; and $cp_{coolant}$ is the specific heat of the coolant fluid.

When the fluid being cooled is EGR gas and the coolant fluid is engine coolant, the capacity ratio may be approximated as 0%. The capacity ratio for an embodiment of the heat exchanger is preferably predetermined for a plurality of engine speed/load operating conditions and EGR flowrates when operating with a clean version of the heat exchanger, taking into account design factors including heat exchanger geometry, surface area and hot fluid/cold fluid flow pattern. The capacity ratio is used to determine NTU numbers for a clean version of the heat exchanger, which are employed as described herein.

Figure 3:
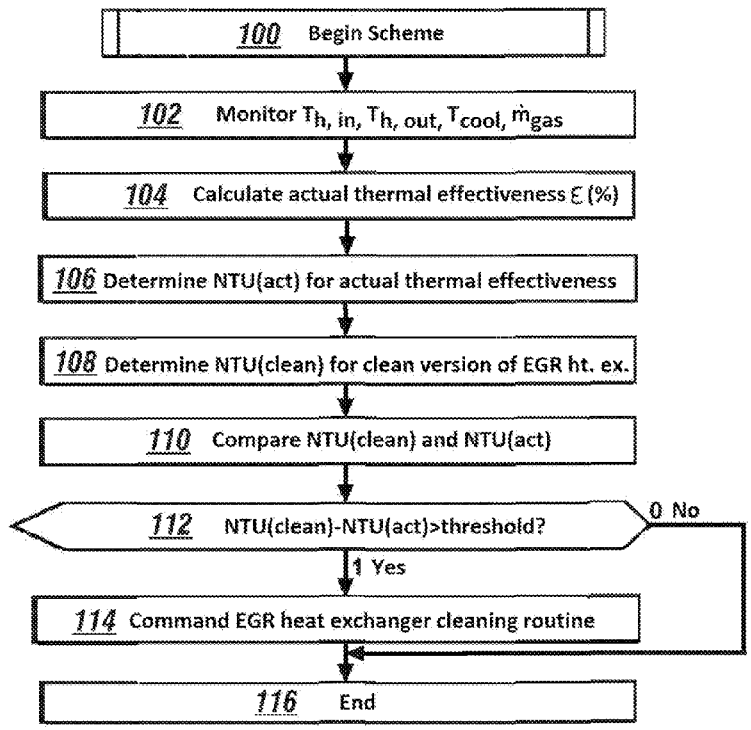
FIG. 3 illustrates a control scheme employed to monitor operating parameters of an engine and EGR heat exchanger to determine when there has been a change in heat transfer capability of the EGR heat exchanger that necessitates executing an EGR heat exchanger cleaning routine, in accordance with the disclosure.

FIG. 3 schematically shows a control scheme 100 that is iteratively executed during ongoing operation of the exemplary internal combustion engine. The control scheme 100 is employed to regularly monitor operating parameters of the engine 10 and the EGR heat exchanger 46 to determine when there has been a change in heat transfer capability of the EGR heat exchanger 46 that necessitates executing an EGR heat exchanger cleaning routine. Table 1 is provided as a key to FIG. 3 wherein the numerically labeled blocks and the corresponding functions are set forth as follows.

TABLE 1

| BLOCK | BLOCK CONTENTS |
|---|---|
| 102 | Monitor $T_{h,in}$, $T_{h,out}$, $T_{cool}$, $\dot{m}_{gas}$ |
| 104 | Calculate actual thermal effectiveness ε (%) |
| 106 | Determine NTU(act) for actual thermal effectiveness ε (%) |
| 108 | Determine NTU(clean) for clean version of the EGR heat exchanger |
| 110 | Compare NTU(clean) and NTU(act) |
| 112 | NTU(clean) − NTU(act) > threshold? |
| 114 | Command execution of EGR heat exchanger cleaning routine |
| 116 | End |

During ongoing operation of the internal combustion engine 10 states of operating parameters including the EGR gas inlet temperature 45 ($T_{h,in}$), EGR gas outlet temperature 47 ($T_{h,out}$), EGR mass flowrate 49 ($\dot{m}_{gas}$) and engine coolant temperature 35 ($T_{cool}$) are periodically monitored (102). The thermal effectiveness ε (%) of the EGR heat exchanger 46 can be calculated using the aforementioned operating parameters including the EGR gas inlet temperature 45, the EGR gas outlet temperature 47, and the engine coolant temperature 35. The thermal effectiveness ε (%) is related to factors associated with the heat exchanger including its geometry, area and flow pattern. The actual thermal effectiveness ε (%) for a heat exchanger is calculated (104) as follows:

$$\varepsilon \equiv \frac{q_{actual}}{q_{max\ i}} = \frac{T_{h,in} - T_{h,out}}{T_{h,in} - T_{c,in}} \quad [2]$$

wherein $q_{actual}$ is related to actual heat transfer;

$q_{max\ i}$ is related to maximum heat transfer;

$T_{h,in}$ is inlet gas temperature on the hot side of the heat exchanger;

$T_{h,out}$ is outlet gas temperature on the hot side of the heat exchanger; and $T_{c,in}$ is inlet coolant temperature on the cold side of the heat exchanger.

An NTU number ($NTU_{act}$) can be calculated from the thermal effectiveness ε (%) for a known heat exchanger operating at a known engine operating point with the capacity ratio estimated to be 0% for the system (106). When the capacity ratio is estimated as 0%, the inlet coolant temperature on the cold side of the heat exchanger $T_{c,in}$ is determined based upon the coolant temperature.

An exemplary relationship between the NTU number and thermal effectiveness ε (%) at a known engine operating point with the capacity ratio at 0% is shown with reference to FIG. 2. The NTU number can be calculated from the thermal effectiveness ε (%) as follows.

$$\varepsilon = 1 - e^{-NTU} \quad [3]$$

The NTU number is a non-dimensional heat transfer term that may also be determined as follows:

$$NTU = \frac{UA}{\dot{m}_{gas} * cp_{gas}} \quad [4]$$

wherein U is the overall heat transfer coefficient (W/K/m²);

A is the overall heat transfer surface area (m²) of the heat exchanger;

$\dot{m}_{gas}$ is mass flowrate of the EGR gas; and $cp_{gas}$ is specific heat of the EGR gas.

Thus, when the NTU number is determined, the overall heat transfer coefficient U can be calculated. The overall heat transfer coefficient U and the overall heat transfer surface area A (m²) of the heat exchanger have a relationship that is defined with reference to the cold side (coolant) and the hot side (EGR gas) of the EGR heat exchanger, as follows:

$$\frac{1}{UA_{overall}} = \frac{1}{h_{cold}A_{cold}} + \frac{1}{h_{hot}A_{hot}} \quad [5]$$

wherein $h_{cold}$ is the heat transfer coefficient of the cold side of the heat exchanger;

$h_{hot}$ is the heat transfer coefficient of the hot side of the heat exchanger;

$A_{mid}$ is the heat transfer surface area (m²) of the cold side of the heat exchanger; and $A_{hot}$ is heat transfer surface area (m²) of the hot side of the heat exchanger.

Thermal resistance of the wall of the heat exchanger is considered negligible in one application, but may be included if deemed non-negligible. For a known system, the heat transfer coefficient of the cold side of the heat exchanger ($h_{cold}$), the heat transfer surface area of the cold side of the heat exchanger ($A_{cold}$), and the heat transfer surface area of the hot side of the heat exchanger ($A_{hot}$) are known. Thus, when the NTU number is calculated from the thermal effectiveness ε

(%), EQ. 5 may be employed to calculate the heat transfer coefficient of the hot side of the heat exchanger ($h_{hot}$) for the present engine operating point.

An NTU number ($NTU_{clean}$) for a clean version of the EGR heat exchanger is determined for the present engine operating point (108). The NTU number is preferably predetermined as previously described and stored as a calibration vector in a controller. The NTU number ($NTU_{clean}$) for a clean version of the EGR heat exchanger indicates a maximum heat transfer capability for the EGR heat exchanger, and may be used to determine a maximum thermal effectiveness for the engine operating point. A thermal performance rig may be employed to characterize the EGR heat exchanger, including calculating a Nusselt number (Nu) for a clean version of the EGR heat exchanger based upon its thermal performance and known metrics including the overall heat transfer surface area A of the EGR heat exchanger. Prior knowledge of the Nusselt number (Nu) and the heat transfer surface area facilitates determining heat exchange performance of the EGR heat exchanger at any operating condition when the surface is clean. The Nusselt number (Nu) is useful in determining thermal effectiveness of the EGR heat exchanger, including determining the NTU number. The Nusselt number (Nu) and the NTU number ($NTU_{clean}$) are used to estimate UA employing EQ. 4. A maximum value for the heat transfer coefficient of the hot side of the heat exchanger ($h_{hot-max}$) is known for the present engine operating point, and is preferably predetermined for the heat exchanger for the EGR mass flowrate 49 ($\dot{m}_{gas}$).

The actual NTU number ($NTU_{act}$) is compared to the clean NTU number ($NTU_{clean}$) (110). When a difference between the actual NTU number ($NTU_{act}$) and the clean NTU number ($NTU_{clean}$) is greater than a threshold value (112), execution of an EGR heat exchanger cleaning routine is commanded (114)(1). Otherwise (114)(0), execution of the present iteration of the control scheme 100 ends without commanding execution of an EGR heat exchanger cleaning routine (116).

Heat transfer out of the EGR gas using a heat exchanger may be determined as follows:

$$Q = \dot{m} * cp * (T_{gas,in} - T_{gas,out}) \quad [6]$$

wherein Q is the heat transfer (J/s or W);
in is the mass flowrate of the EGR gas (kg/s);
cp is the specific heat (J/kg-K) of the EGR gas;
$T_{gas,in}$ is the inlet temperature to the EGR heat exchanger (K); and
$T_{gas,out}$ is the outlet temperature from the EGR heat exchanger (K).

As indicated by FIG. 2, the thermal effectiveness $\epsilon$ (%) for the exemplary heat exchanger may be determined by determining the NTU number and employing the relationship shown with the capacity ratio of 0% for a system configured to cool EGR gas using engine coolant in a cross-flow relationship, as described herein.

Thus, to establish performance of an EGR heat exchanger that is installed on an engine and subjected to fouling, it is necessary to know the EGR heat exchanger inlet/outlet gas temperatures, coolant temperature, and the mass flow of EGR, and thus determine a value for NTU of the EGR heat exchanger in its fouled condition. The same data are also used with the previously determined Nusselt number (Nu) to calculate performance of a clean EGR heat exchanger under the same operating conditions. The difference in the NTU-clean and the NTU-fouled is used to estimate the incremental degree of fouling. A decision is then made to regenerate the EGR heat exchanger based on this information. Regeneration may be effected by increasing the temperature inside the EGR heat exchanger by heating the exhaust gas to eliminate soot or unburned hydrocarbon by oxidization. It is known to provide additional exhaust gas heat through fuel injection control (i.e. additional late injection).

Figure 4:
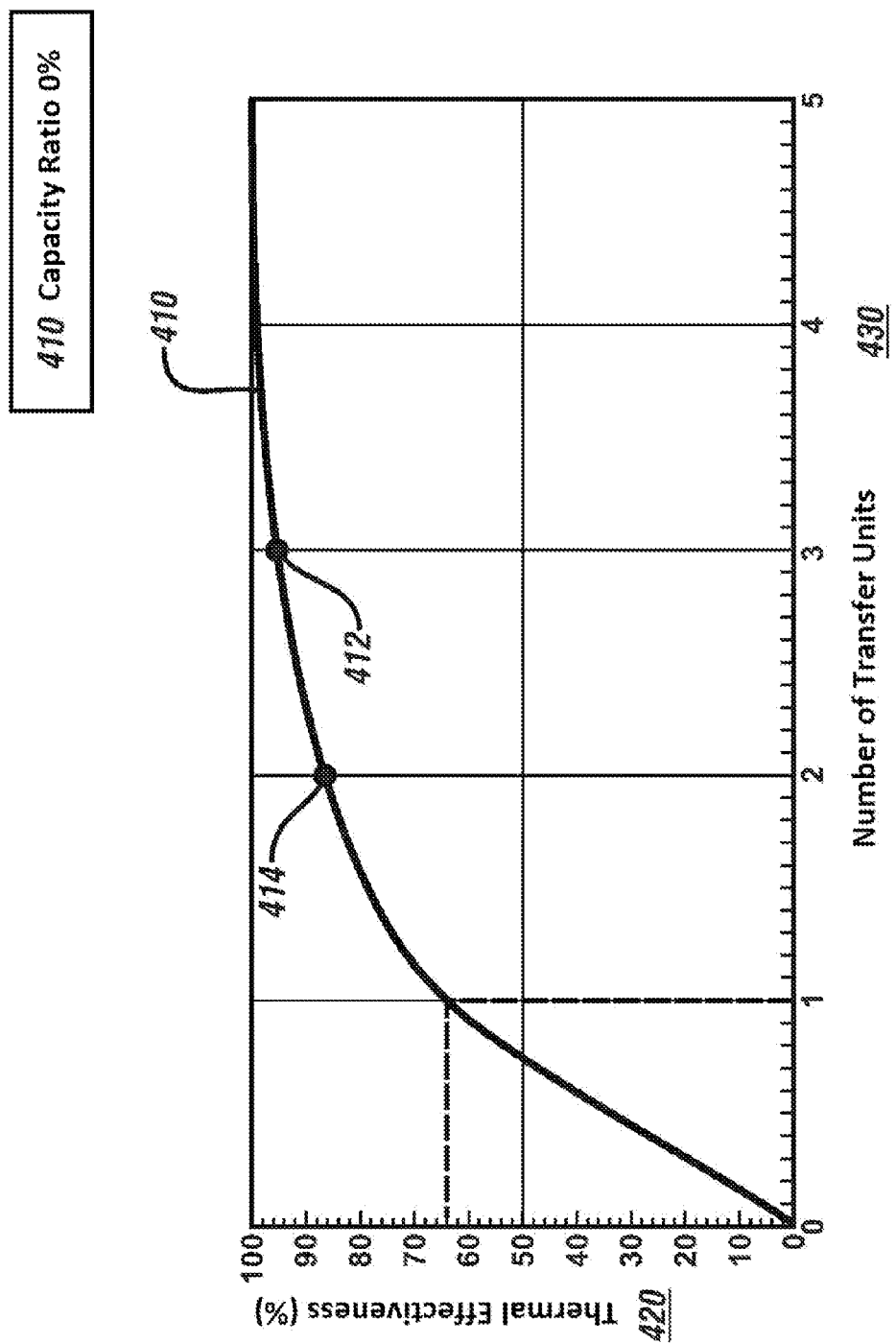
FIG. 4 illustrates data for an exemplary heat exchanger device including thermal effectiveness e (%) correlated to NTU with hot fluid flow and cold fluid flow in a counter-flow arrangement and a capacity ratio of 0%, in accordance with the disclosure.

FIG. 4 graphically shows data for an exemplary heat exchanger device including a line 410 depicting thermal effectiveness $\epsilon$ (%) 420 correlated to NTU 430 with hot fluid flow and cold fluid flow in a counter-flow arrangement at a capacity ratio of 0% for an engine operating point. Point 412 depicts a maximum value for the heat transfer efficiency in terms of the thermal effectiveness $\epsilon$ (%). The corresponding NTU number is identified. Point 414 depicts an aged value for the heat transfer efficiency in terms of the thermal effectiveness $\epsilon$ (%) and corresponding NTU number, and represents performance of the EGR heat exchanger that is considered sufficiently fouled as to require regeneration.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for monitoring an exhaust gas recirculation (EGR) heat exchanger for an internal combustion engine, comprising:
    monitoring an EGR gas inlet temperature to the EGR heat exchanger, an EGR gas outlet temperature from the EGR heat exchanger, a coolant temperature, and a mass EGR flowrate through the EGR heat exchanger for a present engine operating point;
    determining an actual thermal effectiveness of the EGR heat exchanger for the present engine operating point based upon the EGR gas inlet temperature to the EGR heat exchanger, the EGR gas outlet temperature from the EGR heat exchanger, the coolant temperature, and the mass EGR flowrate through the EGR heat exchanger;
    determining a Number of Transfer Units corresponding to the determined actual thermal effectiveness;
    determining a Number of Transfer Units corresponding to a maximum thermal effectiveness of the EGR heat exchanger for the present engine operating point; and
    regenerating the EGR heat exchanger when the Number of Transfer Units corresponding to the determined actual thermal effectiveness differs from the Number of Transfer Units corresponding to the maximum thermal effectiveness for the present engine operating point by more than a threshold.

2. The method of claim 1, wherein determining the Number of Transfer Units corresponding to the determined actual thermal effectiveness comprises:
    determining a capacity ratio for the present engine operating point; and
    determining the Number of Transfer Units corresponding to the determined actual thermal effectiveness based upon the determined actual thermal effectiveness and the determined capacity ration for the present operating point.

3. The method of claim 2, wherein determining the Number of Transfer Units corresponding to the determined actual thermal effectiveness based upon the determined actual thermal effectiveness and the determined capacity ration for the present operating point comprises referencing a look-up table.

* * * * *